United States Patent [19]

Albert

[11] Patent Number: 5,354,123
[45] Date of Patent: Oct. 11, 1994

[54] ANTI-SKID SYSTEM INCLUDING PRESSURE DIFFERENTIAL AND SOLENOID ACTUATED TRIPLE SEAT, DUAL VALVES

[75] Inventor: Timothy J. Albert, Niles, Mich.

[73] Assignee: Allied-Signal Inc., Morristown, N.J.

[21] Appl. No.: 971,750

[22] Filed: Nov. 5, 1992

[51] Int. Cl.$^5$ .............................................. B60T 8/36
[52] U.S. Cl. ............................. 303/119.2; 137/596.16; 303/115.4; 303/116.2; 303/900; 303/901
[58] Field of Search ............... 137/596.16; 303/115.1, 303/116.1, 116.2, 84.1, 119.2, 900, 901

[56] References Cited

U.S. PATENT DOCUMENTS

| | | | |
|---|---|---|---|
| 2,957,659 | 10/1960 | Yarber | 244/111 |
| 3,776,605 | 12/1973 | Ruof | 303/21 A |
| 3,949,252 | 4/1976 | Riesenberg et al. | 310/168 |
| 4,113,321 | 9/1978 | Bleckmann | 303/92 |
| 4,196,941 | 4/1980 | Goebels | 303/119.2 |
| 4,218,100 | 8/1980 | Kervagoret | 303/119.2 |
| 4,534,382 | 8/1985 | Tanguy | 137/627.5 |
| 4,546,437 | 10/1985 | Bleckmann et al. | 364/426 |
| 4,580,848 | 4/1986 | Widmer | 303/116.1 |
| 4,618,189 | 10/1986 | Nakanishi et al. | 303/115.4 |
| 4,619,289 | 10/1986 | Tsuru et al. | 303/119.2 |
| 4,655,509 | 4/1987 | Ando et al. | 303/10 |
| 4,660,899 | 4/1987 | Ando et al. | 303/115.4 |
| 4,668,024 | 5/1987 | Nakanishi et al. | 303/119.2 |
| 4,685,749 | 8/1987 | Otsuki et al. | 303/116 |
| 4,715,664 | 12/1987 | Nakanishi et al. | 303/111 |
| 4,752,104 | 6/1988 | Miyake | 303/115.4 |
| 4,767,164 | 8/1988 | Yeung | 303/91 |
| 4,828,335 | 5/1989 | Fuller et al. | 303/100 |
| 4,834,469 | 5/1989 | Kohno et al. | 303/119.2 |
| 4,844,119 | 7/1989 | Martinic | 137/596.1 |
| 4,869,558 | 9/1989 | Yoshino | 303/115.4 |
| 4,869,561 | 9/1989 | Gatt et al. | 303/116.2 |
| 4,890,890 | 1/1990 | Leiber | 303/9.6 |
| 4,930,846 | 6/1990 | Miyake et al. | 303/115.4 |
| 4,936,344 | 6/1990 | Gilbert et al. | 137/596.1 |
| 4,938,545 | 7/1990 | Shuey et al. | 303/119 |
| 4,944,331 | 7/1990 | Tackett | 137/625.6 |

FOREIGN PATENT DOCUMENTS

| | | |
|---|---|---|
| 2026831 | 12/1971 | Fed. Rep. of Germany . |
| 2731334 | 1/1979 | Fed. Rep. of Germany . |
| 3225146 | 1/1984 | Fed. Rep. of Germany . |
| 3438646 | 5/1985 | Fed. Rep. of Germany . |
| 2180789 | 11/1973 | France . |
| 2507280 | 12/1982 | France . |
| 2644417 | 9/1990 | France . |
| 2098293 | 11/1982 | United Kingdom ............. 303/119.2 |
| 2241031 | 8/1991 | United Kingdom . |
| 92/17536 | 10/1992 | World Int. Prop. O. . |

Primary Examiner—Matthew C. Graham
Attorney, Agent, or Firm—Larry J. Palguta; Leo H. McCormick, Jr.

[57] ABSTRACT

A brake and anti-skid system (8) having an operator controlled source (11) of hydraulic fluid pressure, a hydraulically actuated wheel brake (12, 39, 17, 41) which responds to applied hydraulic pressure to apply a braking force to the wheel to arrest wheel motion, a low pressure hydraulic fluid return line (26, 35), and a modulator (15) interconnecting the source (11), the return line (26, 35), and the brake (12, 39, 17, 41) for directing fluid from the source (11) to the brake (12, 39, 17, 41) when in a normal braking state and for directing fluid from the brake (12, 39, 17, 41) to the return line (26, 35) when in a second state. An accumulator (23) receives and stores pressurized hydraulic fluid from a pump (37, 52), and a fixed size fluid restriction (27A-D) provides a limited flow of hydraulic fluid from the pump (37, 52) and accumulator (23) to the brake (12, 39, 17, 41) to rebuild the braking force after a skid has been detected and the modulator (15) having decayed fluid from the brake (12, 39, 17, 41) to the return line (26, 35). The modulator (15) includes a triple seat, dual check valve (15A, 15B) and a pair of triple seat, dual solenoid valves (10, 28).

19 Claims, 3 Drawing Sheets

ANTI-SKID SYSTEM INCLUDING PRESSURE DIFFERENTIAL AND SOLENOID ACTUATED TRIPLE SEAT, DUAL VALVES

The present invention relates generally to vehicular braking systems and more particularly to vehicle braking systems having anti-skid or anti-lock features.

Automobile drivers accustomed to driving under snowy or icy conditions are familiar with the technique of "pumping" the brake pedal to cyclically increase and decrease the braking force exerted on the wheels so that a slipping wheel having a tendency to lock is permitted to re-accelerate back to a speed corresponding to the speed of the vehicle. Such a driver induced anti-skid technique is simulated by many known anti-skid devices. In U.S. Pat. No. 4,218,100, the fluid connection between the source and actuator is interrupted and fluid is directed from the actuator to a low pressure reservoir when a skid is detected. There is a second source of pressurized fluid and a pressure responsive valve which opens to replenish the fluid supply to the actuator when the pressure difference between the operator-controlled pressure source and the brake actuator exceeds a predetermined value.

In U.S. Pat. No. 4,944,331, an improved valve for performing the general function of the anti-skid valve of the aforementioned 4,218,100 patent is disclosed. In this patented arrangement, a solenoid actuated three-way, two-position valve is implemented in a single compact unit by providing valve elements at each end of, and commonly moved by, the solenoid armature.

Comonly owned U.S. Pat. Nos. 5,299,859; 5,163,474; 5,226,702 and 5,234,031 disclose combined solenoid valve and shuttle valve assemblies wherein the shuttle valves are pressure differential actuated and provide orificed fluid build flow. It would be advantageous to either eliminate or simplify the shuttle valves.

It is desirable to provide an economical full-featured brake control system having a reduced number of complex valve structures and a reduced number of components which is, therefore, more readily assembled and easily maintained. It is desirable that the anti-skid braking system have enhanced pedal isolation which does not require shuttle valves to provide orificed fluid build flow. It is advantageous that the system utilize a fixed orifice for pressure build in a wheel brake.

The present invention provides solutions to the above problems by providing a combined brake and anti-skid system for a wheeled vehicle comprising:

an operator controlled hydraulic pressure source;

a hydraulically actuated wheel brake which responds to applied hydraulic pressure to apply a braking force to a wheel of the vehicle;

a pressure return line;

pressure source means for communicating pressurized hydraulic fluid; and modulator means comprising a pressure differential actuated triple seat, dual valve effective in a first position to pass hydraulic fluid from the pressure source to the brake to apply the braking force and in a second position responsive to the pressurized hydraulic fluid to block the flow of hydraulic fluid from the pressure source to the brake, a flow control solenoid valve located between the pressure source, the return line, and the brake for directing selectively fluid from the pressure source to the brake and from the brake to the return line, the flow control solenoid valve comprising a solenoid actuated triple seat, dual valve assembly, the modulator means containing both the pressure differential actuated valve and the flow control solenoid valve, and a fluid restriction for providing a limited flow of pressurized hydraulic fluid from the pressure source means to the brake, the pressure source means supplying the pressurized hydraulic fluid to the brake by way of the fluid restriction to rebuild the braking force subsequent to the flow control solenoid valve having directed initially fluid from the brake to the return line.

BRIEF DESCRIPTION OF THE DRAWINGS

Corresponding reference characters indicate corresponding parts throughout the several views of the drawing.

DESCRIPTION OF THE PREFERRED EMBODIMENT

Figure 1:
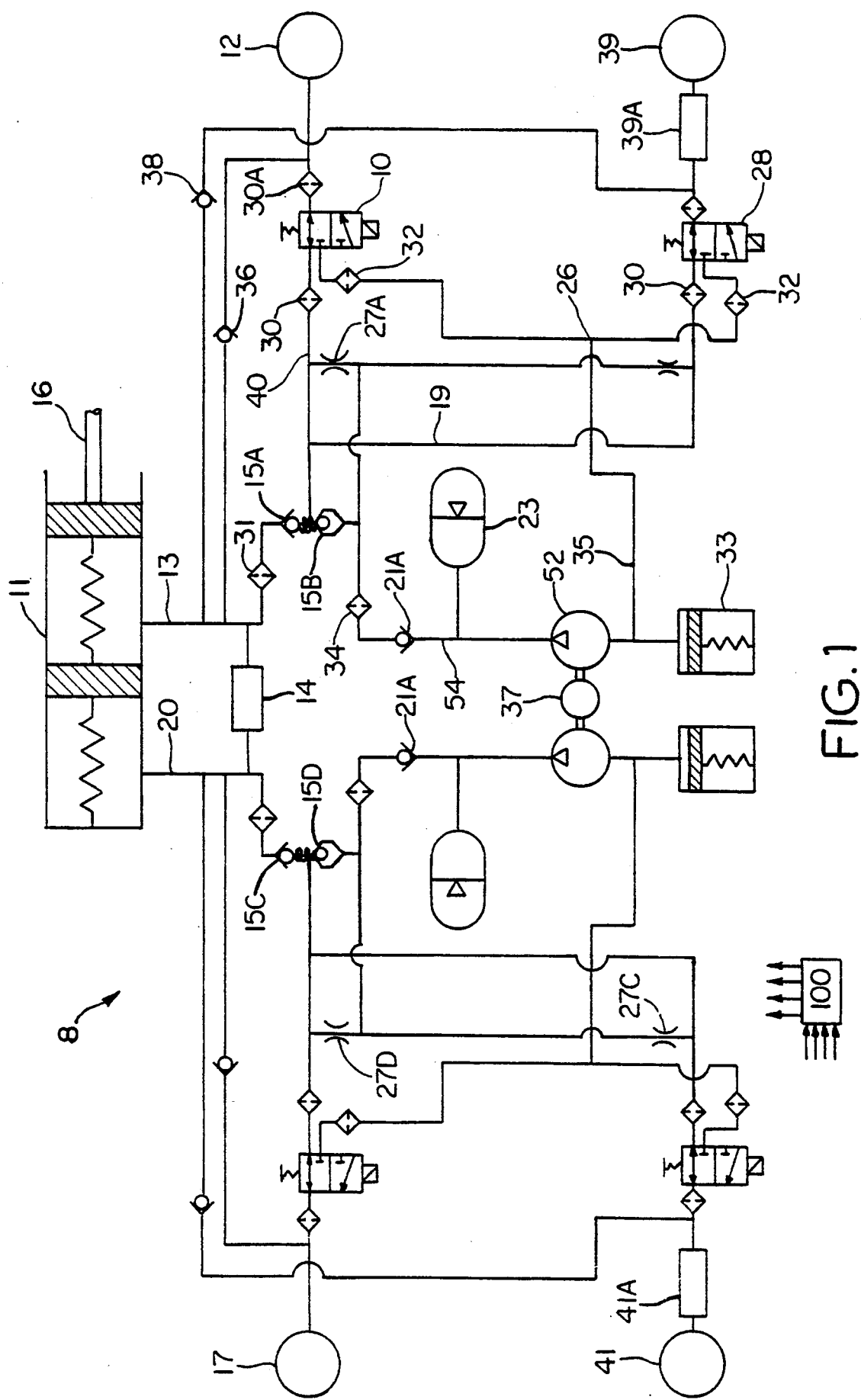
FIG. 1 is a schematic representation of an anti-lock braking control system illustrating the present invention.

In FIG. 1, a four channel anti-lock braking system 8 for a passenger car or similar vehicle is shown schematically. The anti-lock braking system may utilize a standard electronic control unit 100 and associated wheel speed sensing devices. The system has an anti-lock solenoid valve 10 between an operator-controlled pressure source 11 and a right front brake 12. Typically, the pressure source 11 is a conventional master cylinder having two separate circuits for the left front 17/right rear 41 and right front 12/left rear 39 vehicle wheel brakes. The mirror symmetry save for the shared pressure switch 14 and pump motor 37 should be apparent. Moreover, there is a strong symmetry between the front wheel and rear wheel fluid circuits with the only difference being the presence of the proportioning valves 39A and 41A in the rear wheel circuits. These are conventional proportioning valves and are present to reduce the likelihood of a rear wheel skid by applying only a portion of the line pressure to the rear wheel brakes 39, 41 when the hydraulic pressure is above a predetermined threshold. Thus, the description of system 8 will be understood to apply to all four wheels even though primarily the right front wheel circuit is explained in detail. Brake 12 is typically a conventional disc brake for braking the vehicle. As a safety device, a warning light or tone is enabled by pressure switch 14 if the pressure difference between the two opposite sides of the system exceeds a prescribed threshold. Braking system 8 includes numerous conventional filters such as 30, 30A, 31, 32 and 34 as well as one-way check valves such as 36 and 38, the function of which should be clear and requires no further explanation.

There is a low pressure hydraulic fluid return along lines such as 26 and 35 to the sump 33. The two-way build/decay solenoid flow control valve 10 is located between master cylinder 11, return line 26 and brake 12, and acts to direct selectively fluid from the master cylinder to the brake and from the brake to the return line. An accumulator 23 receives and stores pressurized hydraulic fluid provided by pump 37, 52. The pump and accumulator comprise pressure source means that provides fluid pressure for anti-lock braking. The fluid restriction 27A provides a limited flow of hydraulic fluid from the pump 37, 52/accumulator 23 to the hydraulically actuated brake 12 during an anti-lock build mode. A pressure differential actuated triple seat, dual check valve 15A, 15B is shared by brakes 12, 39 and is effective in a first normal braking position (see FIG. 2) to pass hydraulic fluid from the operator controlled master cylinder 11 to brake 12 to apply braking, and in a second position (FIGS. 3 and 4) to block the passage of hydraulic fluid from the operator controlled master cylinder to the corresponding brake. A common modulator housing 57 of modulator 15 in FIGS. 2–4 contains the triple seat, dual check valves 15A, 15B and the triple seat, dual solenoid valves 10, 28. Each valve 10, 28 is effective in the normal braking position (FIG. 2) to direct fluid from the master cylinder 11 to the respective brakes 12, 39 for braking the vehicle, and in the decay mode (FIG. 3) to direct fluid from brakes 12, 39 to relieve braking force while blocking fluid flow from pump 37, 52/accumulator 23 and restrictions 27A, 27B to brakes 12, 39.

The modulator 15 in FIG. 2 will now be explained in detail. Brake line 13 communicates with modulator housing 57 via the dual check valves or valve members 15A, 15B wherein valve 15A is biased by spring 56. Valve 15A seats against valve seat 15X and valve 15B can seat against either valve seat 15Y or 15Z. Located within modulator housing 57 are two-way solenoid valves 10 and 28 which comprise armatures 10A, 28A with respective windings thereabout, each armature being spring biased by respective springs 10D and 28D into an at-rest, inactivated position. Each solenoid valve 10, 28 includes a pair of oppositely disposed rods 10F, 10G and 28F, 28G which include respective ball valve members at the ends thereof. Ball 10H comprises a primary decay ball and ball 10I comprises a secondary decay ball, and likewise for balls 28H and 28I. Balls 10I and 28I engage seats 10I1 and 28I1 during normal braking. When the driver wishes to slow the vehicle, the rod 16 (FIG. 1) is displaced by the brake pedal and hydraulic fluid pressure is transmitted from master cylinder 11 by way of brake lines 13, 20 to actuate the four wheel brakes and brake the vehicle. Fluid flow received from line 13 opens check valve 15A so that fluid flows past seat 15X while simultaneously closing check valve 15B against seat 15Z. The fluid flows into chamber 57A and past primary decay balls 10H, 28H, to bypass flow paths 57B and then out to lines 19 and 40 and the associated wheel brakes. This is the fluid flow path for normal braking effected by master cylinder 11. During normal braking, the secondary decay balls 10I and 28I prevent fluid from entering flow paths 57C and exiting via return lines 26. Check valve 21A in line 54 serves as an anti-mush check valve which prevents fluid flowing through restrictions 27A and 27B and to chamber 42 from flowing toward pump 37, 52.

Figure 3:
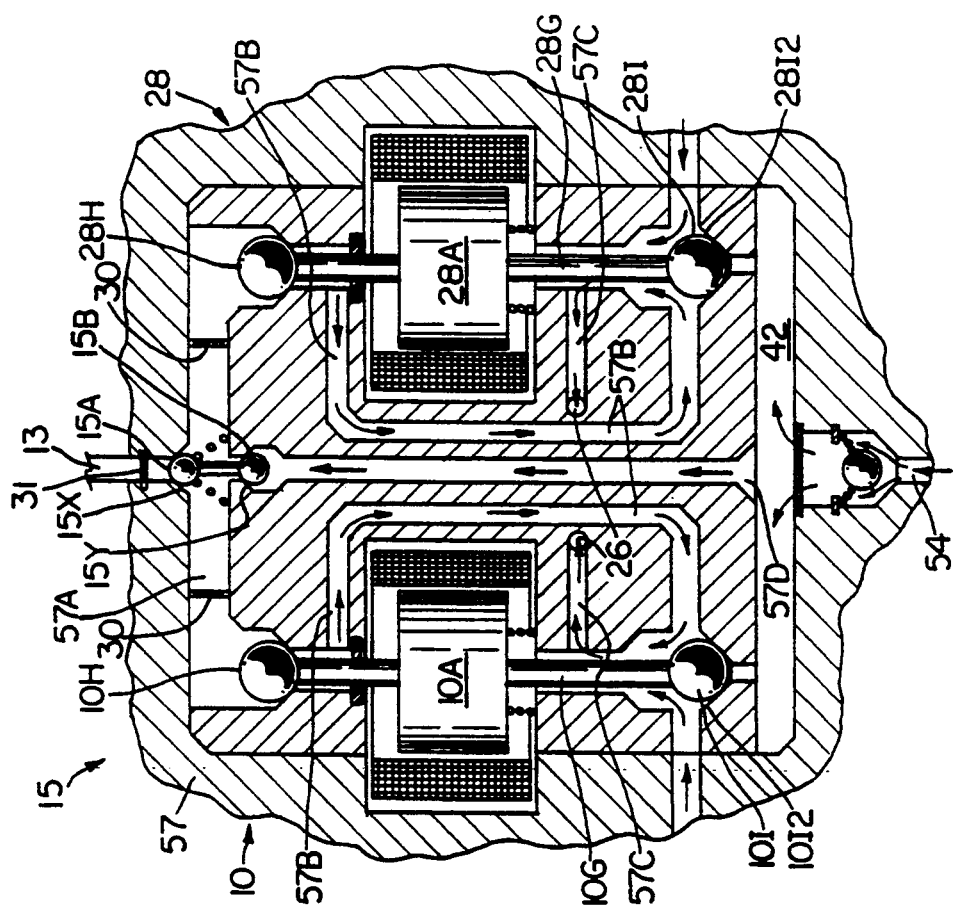
FIG. 3 is a cross-section view of the modulator of FIG. 2 but showing the valve positioning in the decay mode.

In the event that the electronic control unit 100 detects a sufficient difference between wheel speed and vehicle speed to indicate an imminent skid, a signal is sent to actuate selectively the four two-way solenoids such as build/decay solenoid valve 10 and terminate the hydraulic fluid flow from the master cylinder 11 to the respective wheel brake such as wheel brake 12. Referring to FIGS. 1 and 3, the electronic control unit 100 activates the coils about armatures 10A, 28A to actuate each of the armatures and cause the primary decay balls 10H, 28H to be moved into engagement with the respective valve seats. Simultaneously, the rods 10G, 28G move the secondary decay balls 10I, 28I into engagement with respective valve seats 10I2 and 28I2 so that during decay mode operation when fluid pressure is being received from pump 37, 52 via line 54, fluid pressure will not pass into flow paths 57B and be transmitted to the wheel brakes. As shown by the flow lines in FIG. 3, fluid at wheel brake 12 is permitted to flow via connection flow paths 57C to the low pressure decay or return line 26 and subsequently line 35 and the input side of pumping section 52. At initial solenoid actuation, fluid decays away from chamber 57A and past balls 10H and 28H toward lines 26 via flow paths 57B and 57C, and the initial lowering of pressure within chamber 57A results in the higher pressure in flow path 57D (from accumulator 23 and energized pump 37, 52) causing the triple seat, dual check valves 15A, 15B to be displaced so that check valve 15B engages sealingly check valve seat 15Y and check valve 15A engages seat 15X to isolate the master cylinder 11. The check valves 15A and 15B remain in this position during the subsequent antilock build and decay modes of operation.

Figure 2:
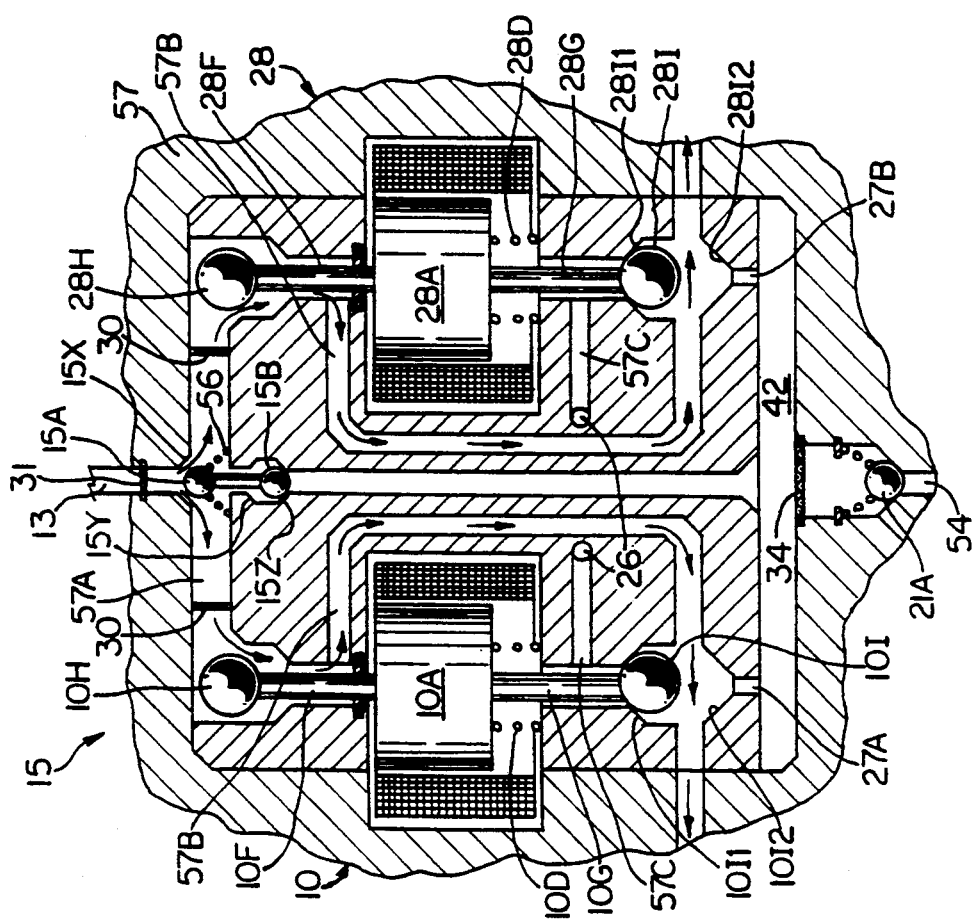
FIG. 2 is a cross-section view of an illustrative modulator including solenoids and associated valves for a pair of vehicle wheel brakes in the normal braking configuration.
Figure 4:
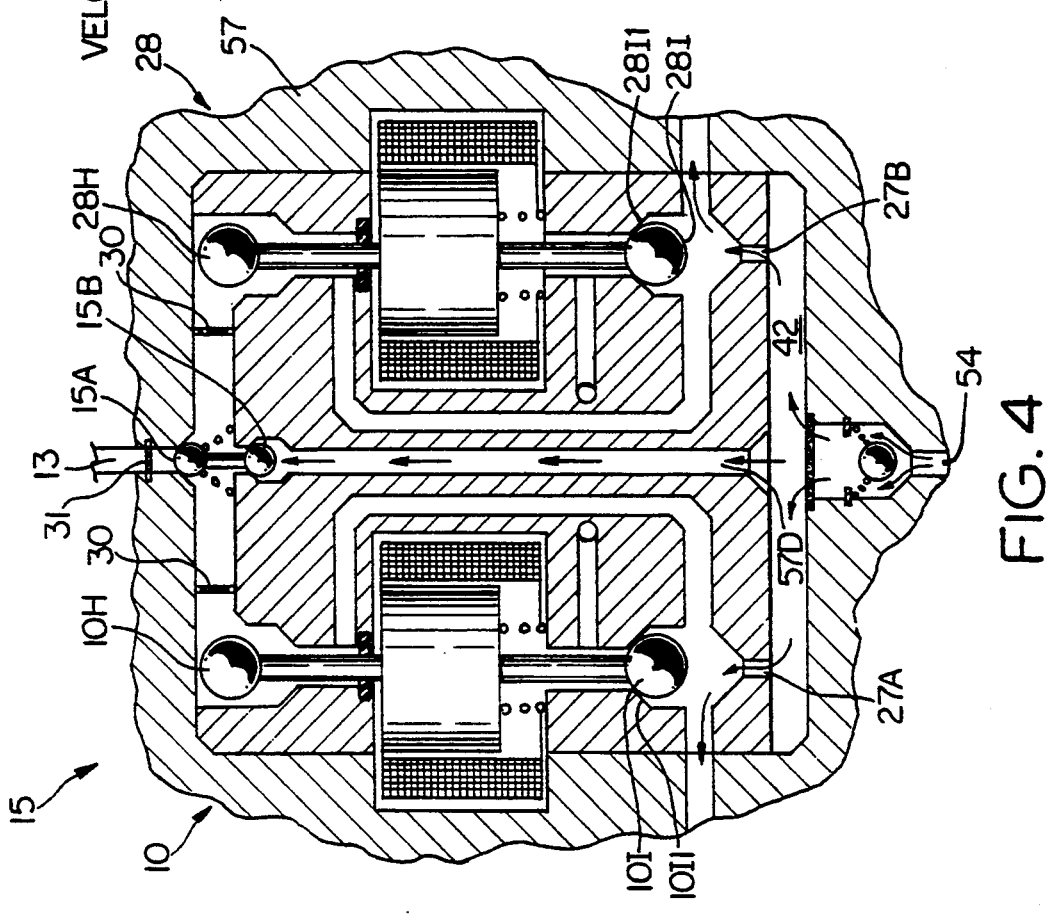
FIG. 4 is a cross-section view of the modulator of FIG. 2 but showing the valve positioning in the build mode.

Referring to FIG. 4, at a time when wheel speed gets sufficiently close to vehicle speed, the solenoid valves 10, 28 are de-energized and resume their prior deactivated positions as also illustrated in FIG. 2 where the secondary decay balls 10I, 28I engage the respective check valve seats 10I1 and 28I1 and the primary decay balls 10H, 28H are positioned away from the respective valve seats. The presence of high pressure fluid being transmitted continuously via line 54 and flow path 57D keeps the dual check valves 15A, 15B in their respective isolation positions so that master cylinder 11 remains isolated from communication with pump 37, 52. High pressure fluid from line 54 enters chamber 42 and flows through restrictions 27A, 27B and outwardly toward the respective wheel brakes 12, 39A via lines 40, 19. When brake pressure and accumulator pressure equalizes after the termination of antilock braking, check valves 15A, 15B open and permit fluid communication from master cylinder 11.

Known anti-lock circuits may employ four anti-lock solenoid valves functioning somewhat as discussed, but also may employ four (one for each wheel) shuttle valves each having a movable orifice defining member, and which have been eliminated by the present invention. Instead, four fixed orifices 27A–D and the two pairs of triple seat, dual check valves comprising pressure differential activated valves 15A, 15B and 15C, 15D are employed (see FIG. 1).

Figure 5:
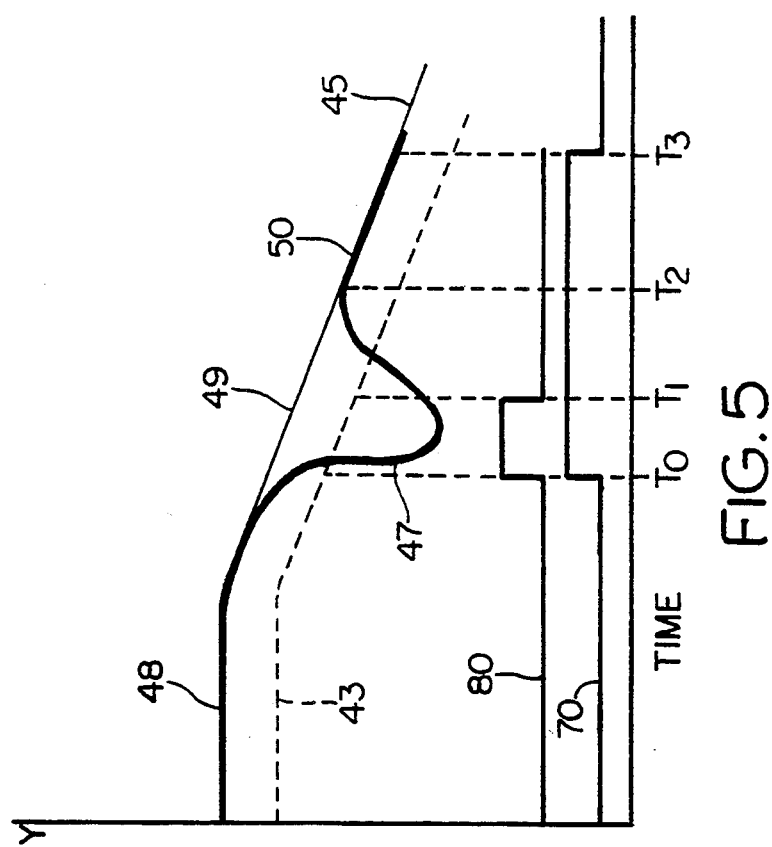
FIG. 5 is a timing diagram illustrating wheel and vehicle velocities, and the output of the electronic control unit.

Referring to FIG. 5, a known electronic control unit establishes a speed or velocity decay threshold along dotted line 43. Actual vehicle velocity is indicated by the thin solid line 45 while wheel speed (as measured by a typical speed sensing device) is shown by the thick solid line 47. Wheel speed and vehicle speed coincide along the regions 48 and 50 which indicate no wheel locking while the two differ along region 49 indicating a locking of a wheel. When the wheel speed 47 decreases to the point where it crosses the decay threshold 43 at time $T_0$, pump motor 37 (signal 70) and the respective solenoid valve such as 10 or 28 (line 80) are energized. Time $T_0$ indicates the time at which a solenoid valve of modulator 15 transitions from the configuration shown in FIG. 2 to that of FIG. 3. At time $T_1$, the locking of the respective wheel has been terminated as a result of the decaying of brake pressure as shown in FIG. 3. At this time, it is desired to rebuild braking pressure and the previously activated solenoid valve of modulator 15 transitions from the decay mode of FIG. 3 to the build mode of FIG. 4. At this time, the solenoid valve for the respective wheel brake is de-energized. Wheel velocity 47 will return to a non-skid or nonlocking velocity by time $T_2$ during a build mode in which brake pressure is increased as shown in FIG. 4. Valve(s) will transition back to the normal braking configuration (as shown in FIG. 2) at time $T_3$ when the pump motor 37 is de-energized.

What is claimed is:

1. A combined brake and anti-skid system for a wheeled vehicle comprising:

an operator controlled hydraulic pressure source;

a hydraulically actuated wheel brake which responds to applied hydraulic pressure to apply a braking force to a wheel of the vehicle;

a pressure return line;

pressure source means for communicating pressurized hydraulic fluid; and modulator means comprising a pressure differential actuated triple seat, dual valve effective in a first position to pass hydraulic fluid from the pressure source to the brake to apply the braking force and in a second position responsive to the pressurized hydraulic fluid to block the flow of hydraulic fluid from the pressure source to the brake, a flow control solenoid valve located between the pressure source, the return line, and the brake for directing selectively fluid from the pressure source to the brake and from the brake to the return line, the flow control solenoid valve comprising a solenoid actuated triple seat, dual valve assembly, the modulator means containing both the pressure differential actuated valve and the flow control solenoid valve, and a fluid restriction for providing a limited flow of pressurized hydraulic fluid from the pressure source means to the brake, the pressure source means supplying the pressurized hydraulic fluid to the brake by way of the fluid restriction to rebuild the braking force subsequent to the flow control solenoid valve having directed, at initial actuation fluid from the brake to the return line.

2. The combined brake and anti-skid system of claim 1, wherein the flow control solenoid valve is effective in one position to direct fluid from the pressure source to the brake to brake the vehicle and in another position to direct fluid from the brake to relieve braking force and block pressurized hydraulic fluid from the pressure source means to the brake.

3. The combined brake and anti-skid system of claim 1, wherein the solenoid actuated triple seat, dual valve assembly includes dual valve seats engageable selectively by a valve member, and the fluid restriction disposed adjacent one of the dual valve seats which is engaged by the valve member during the relief of braking force at the brake.

4. A modulator for an anti-skid braking system, comprising a housing having therein a pressure differential actuated triple seat, dual valve effective in a first position to pass therethrough hydraulic fluid from a pressure source to a wheel brake to apply braking force and in a second position responsive to pressurized hydraulic fluid to block the flow of hydraulic fluid from the pressure source to the brake, a fluid flow control solenoid valve located between the pressure source, return line, and the brake directing selectively fluid flow from the pressure source to the brake and from the brake to a return line, the fluid flow control solenoid valve comprising a solenoid actuated triple seat, dual valve assembly, the pressure differential actuated triple seat, dual valve comprising a rod having first and second valve members located at opposite ends thereof, the first valve member biased by resilient means toward a valve seat and the second valve member located in a fluid flow path between dual valve seats which are engaged selectively by the second valve member according to inactivated and activated modes of the second valve member.

5. A modulator for an anti-skid braking system, comprising a housing having therein a pressure differential actuated triple seat, dual valve effective in a first position to pass therethrough hydraulic fluid from a pressure source to a wheel brake to apply braking force and in a second position responsive to pressurized hydraulic fluid to block the flow of hydraulic fluid from the pressure source to the brake, a fluid flow control solenoid valve located between the pressure source, return line, and the brake directing selectively fluid flow from the pressure source to the brake and from the brake to a return line, the fluid flow control solenoid valve comprising a solenoid actuated triple seat, dual valve assembly which includes a pair of actuation rods having valve members located at respective ends of the rods, one valve member engaging an associated valve seat to prevent fluid flow therepast when the other valve member is displaced away from an associated valve seat to permit fluid flow therepast.

6. The modulator in accordance with claim 5, further comprising a chamber which receives the pressurized hydraulic fluid and the chamber including a fluid flow restriction adjacent a valve seat which may be engaged by the one valve member, the restriction providing for reduced fluid flow to the wheel brake.

7. The modulator in accordance with claim 6, wherein the valve seat adjacent the restriction is located adjacent the associated valve seat engaged by the one valve member, displacement of the one valve member by the rod effecting an opening of the associated valve seat and a closing of the valve seat adjacent the restriction so that fluid may flow away from the wheel brake and to the return line.

8. The modulator in accordance with claim 7, wherein the chamber communicates with a through passage of the housing to provide pressurized hydraulic fluid to the pressure differential actuated triple seat, dual valve which is displaced against and closes a dual valve seat thereof.

9. A combined brake and anti-skid system for a wheeled vehicle comprising:

an operator controlled hydraulic pressure source;

a hydraulically actuated wheel brake which responds to applied hydraulic pressure to apply a braking force to a wheel of the vehicle;

a pressure return line;

pressure source means for communicating pressurized hydraulic fluid; and modulator means comprising a pressure differential actuated triple seat, dual valve effective in a first position to pass hydraulic fluid from the pressure source to the brake to apply the braking force and in a second position responsive to the pressurized hydraulic fluid to block the flow of hydraulic fluid from the pressure source to the brake, and a flow control solenoid valve located between the pressure source, the return line, and the brake for directing selectively fluid from the pressure source to the brake and from the brake to the return line, the pressure differential actuated triple seat, dual valve comprising a rod having first and second valve members located at opposite ends thereof, the first valve member biased by resilient means toward a valve seat and the second valve member located in a fluid flow path between dual valve seats which are engaged selectively by the second valve member according to the activated and inactivated modes of the second valve member.

10. The combined brake and anti-skid system of claim 9, wherein the flow control solenoid valve comprises a solenoid actuated triple seat, dual valve assembly.

11. The combined brake and anti-skid system of claim 10, wherein the solenoid actuated triple seat, dual valve assembly comprises a pair of actuation rods having valve members located at respective ends of the rods, one valve member engaging an associated valve seat to prevent fluid flow therepast when the other valve member is displaced away from associated valve seat to permit fluid flow therepast.

12. The combined brake and anti-skid system of claim 10, wherein the solenoid actuated triple seat, dual valve assembly includes dual valve seats engageable selectively by a valve member, and a fluid restriction located adjacent one of the dual valve seats which is engaged by the valve member of the assembly during the relief of braking force at the brake.

13. The combined brake and anti-skid system of claim 12, further comprising a chamber which receives the pressurized hydraulic fluid and the chamber including the fluid restriction adjacent the one valve seat, the restriction providing for reduced fluid flow to the wheel brake.

14. The combined brake and anti-skid system of claim 13, wherein the chamber communicates with a through passage of the modulator to provide pressurized hydraulic fluid to the pressure differential actuated triple seat, dual valve which is displaced against and encloses a dual valve seat thereof.

15. A modulator for an anti-skid braking system, comprising a housing having therein a pressure differential actuated triple seat, dual valve effective in a first position to pass hydraulic fluid from a pressure source to a wheel brake to apply braking force and in a second position responsive to pressurized hydraulic fluid to block the flow of hydraulic fluid from the pressure source to the brake, a flow control solenoid valve located between the pressure source, return line, and the brake directing selectively fluid from the pressure source to the brake and from the brake to a return line, the flow control solenoid valve comprising a solenoid actuated triple seat, dual valve assembly having a pair of actuation rods with valve members located at respective ends of the rods and the other ends of the rods connected to an armature, one valve member engaging an associated valve seat to prevent fluid flow therepast when the other valve member is displaced away from an associated valve seat to permit fluid flow therepast, a bypass channel permitting the fluid flowing past the other valve member to be communicated to the brake, and the one valve member preventing fluid flow therepast to a connecting flow path which connects with the return line.

16. The modulator in accordance with claim 15, further comprising coil means disposed about said armature and resilient means biasing said armature.

17. The modulator in accordance with claim 16, further comprising a chamber which receives the pressurized hydraulic fluid and the chamber including a fluid flow restriction adjacent a valve seat which may be engaged by the one valve member, the restriction providing for reduced fluid flow to the wheel brake.

18. The modulator in accordance with claim 17, comprising a fluid line connecting with the chamber via check valve means which prevents fluid flow from said chamber to said fluid flow line.

19. The modulator in accordance with claim 18, further comprising filter means located between said chamber and check valve means.

* * * * *